United States Patent
Bogomjakov (10) Patent No.: US 10,255,717 B2
(45) Date of Patent: Apr. 9, 2019

(54) GEOMETRY SHADOW MAPS WITH PER-FRAGMENT ATOMICS

(71) Applicant: NVIDIA Corporation, Santa Clara, CA (US)

(72) Inventor: Alexander Bogomjakov, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 68 days.

(21) Appl. No.: 15/340,913

(22) Filed: Nov. 1, 2016

(65) Prior Publication Data
US 2018/0122132 A1    May 3, 2018

(51) Int. Cl.
*G06T 15/80* (2011.01)
*G06T 15/60* (2006.01)
*G06T 1/20* (2006.01)

(52) U.S. Cl.
CPC ............ *G06T 15/60* (2013.01); *G06T 1/20* (2013.01); *G06T 15/80* (2013.01)

(58) Field of Classification Search
CPC .......................... G06T 15/60; G06T 2215/12
See application file for complete search history.

(56) References Cited

U.S. PATENT DOCUMENTS

| | | | | |
|---|---|---|---|---|
| 7,158,133 | B2 * | 1/2007 | Hong et al. | G06T 15/60 345/426 |
| 2005/0198644 | A1 * | 9/2005 | Jiang et al. | G06F 9/52 718/107 |
| 2009/0079758 | A1 * | 3/2009 | Annen et al. | G06T 15/60 345/607 |
| 2011/0002529 | A1 * | 1/2011 | Jeong | G01B 11/25 382/147 |
| 2011/0032256 | A1 * | 2/2011 | Ha | G06T 15/60 345/420 |
| 2013/0163053 | A1 * | 6/2013 | Wang et al. | H04N 1/4051 358/3.06 |
| 2016/0170438 | A1 * | 6/2016 | Wu et al. | G06F 1/12 713/400 |
| 2017/0269865 | A1 * | 9/2017 | Willcock | H04N 19/186 |

* cited by examiner

*Primary Examiner* — Phi Hoang (57) ABSTRACT

Embodiments of the present invention are directed to techniques for improving the efficiency of shadow mapping by using highly optimized hardware-accelerated rasterizers. Embodiments of the present invention use a shader (such as a fragment or compute shader) to construct advanced shadow maps which store a list of polygons that intersect each pixel, and synchronizing read/write operations (e.g., with atomics) to ensure consistency of the texture accesses when managing the per-texel triangle lists during creation. By using these hardware-accelerated and optimized techniques, high quality hard shadows can be produced during real-time rendering, as performed in graphics processing engines, for example. Moreover, this technique can be synchronized with other pre-fragment features that are becoming increasingly prevalent and efficient in the latest processing architectures.

20 Claims, 4 Drawing Sheets

Exemplary Computer System 400

Figure 4

GEOMETRY SHADOW MAPS WITH PER-FRAGMENT ATOMICS

FIELD OF THE INVENTION

Embodiments of this present invention are directed toward techniques for improving shadow rendering performance for rendered graphical displays. More specifically, embodiments of the invention are directed to solutions for performing shadow rendering in a processor, such as a graphics processing system.

BACKGROUND OF THE INVENTION

In the field of computer-generated graphics, shadow mapping is a technique for rendering shadows in a scene. Typically, shadow mapping is performed on scenes in which objects are represented as multiple, adjacent polygons (usually triangles). To perform shadow mapping, a scene is rasterized from the view point of a light source that creates the shadows. A shadow map is constructed from this rasterization, commonly as a texture that contains the depth information of the scene. Thereafter, the scene is rendered from the view point of the viewer/camera by projecting the rasterized object fragments on to the shadow map, and comparing the depth of the fragments to determine whether the fragments are within the shadow relative to the light source.

In contrast to alternate techniques such as ray tracing and shadow volume, shadow mapping requires significantly less overhead. However, conventional shadow mapping techniques also suffer from drawbacks of their own. One of the major problems with conventional shadow mapping techniques is that the shadow map texture—which contains the geometry of the scene as it is rasterized from the view point of the light source—has a finite resolution. As such, the size and depth of the shadow map determines the quality of the final shadows rendered. Under certain (common) circumstances, this resolution may not be enough to provide the finer details of the outline of the shadow. When the resolution is insufficient, aliasing and/or shadow continuity glitches may occur. In particular, aliasing artifacts may arise near the boundaries between shadows and light.

Various solutions have been proposed to reduce boundary artifacts. One approach is based on re-parameterizing the shadow map, such that more samples are available in the places that are needed (e.g., boundaries). Unfortunately, re-parameterization techniques are limited in that the total amount of available samples is fixed by the scene, and may not be sufficient in all circumstances. These techniques tend to reduce, but not eliminate, the aliasing artifacts. Other solutions include using irregular texturing and z-buffering, thereby effectively achieving infinite shadow map resolution. However, these shadow maps have to be recomputed for each new view point or position, which can be resource and time-intensive when the view point changes frequently.

Recently, approaches have been developed which have been based on so-called geometry shadow maps. Under these approaches, instead of storing rasterized scene geometry, each shadow map texel contains a list of triangles whose projections on the light image plane at least partially overlap with this texel. During rendering, the shadow ray visibility tests can be exact because it is done against the actual triangles. However, existing implementations of the geometry shadow map approach rely on software rasterizers implemented with the CUDA parallel processing platform to construct the per-texel triangle lists.

SUMMARY OF THE INVENTION

This Summary is provided to introduce a selection of concepts in a simplified form that are further described below in the Detailed Description. This Summary is not intended to identify key features or essential features of the invention, nor is it intended to be used to limit the scope of the invention.

Embodiments of the present invention are directed to techniques for improving the efficiency of shadow mapping by using highly optimized hardware-accelerated rasterizers. Embodiments of the present invention use a shader (such as a fragment or compute shader) to construct advanced shadow maps and synchronizing read/write operations (e.g., using atomic operations) to ensure consistency of the texture accesses when managing the per-texel triangle lists. By using these hardware-accelerated and optimized techniques, high quality hard shadows can be produced during real-time rendering, as performed in graphics processing engines, for example. Moreover, this technique can be synchronized with other pre-fragment features that are becoming increasingly prevalent and efficient in the latest processing architectures.

According to one embodiment of the present invention, a method is provided that includes determining an occluded area in a graphical scene, computing an advanced shadow map comprising a list of polygons for each pixel in the occluded area, storing the advanced shadow map in a memory, and performing shadow rendering for the list of polygons using the advanced shadow map. According to further embodiments, determining the occluded area is performed by generating a normal shadow map for the pixels in the scene, rasterizing the scene from the viewpoint of the camera, and comparing the rasterized scene with the normal shadow map to determine the occluded area.

In one or more embodiments, the boundary of the occluded area may be determined (e.g., by querying the normal shadow map), and the shadow rendering of the polygons may thereafter be performed by using the advanced shadow map as a reference. In alternate embodiments, after the boundary of the occluded area is determined, shadow rendering of the polygons that lie entirely within the boundary of the occluded area may be performed using the normal shadow map as reference, while the shadow rendering of polygons (and polygon fragments) that overlap the boundary is performed using the advanced shadow map. According to further embodiments, shadow rendering of polygons both lying within the boundary of the occluded area and overlapping the boundary of the occluded area may be performed in separate rendering passes using the normal and advanced shadow maps, respectively. Finally, shadow rendering of polygons both lying within the boundary of the occluded area and overlapping the boundary of the occlude area may be performed in separate rendering passes using only the advanced shadow map. To prevent memory access collisions when constructing the advanced shadow map, memory access requests can be synchronized by parallel operating threads using atomic operations.

By providing an advanced shadow map implemented using a shader, high quality hard shadows can be performed in real-time rendering sources, such as game engines, without being strictly limited to using software rasterizers implemented with the CUDA framework and its inherent limitations.

More specifically, an embodiment of the present invention is directed to a method for performing shadow mapping, the method comprising: determining an occluded area in a graphical scene comprising a plurality of pixels, the graphical scene depicting a plurality of objects graphically rendered as a plurality of polygons; computing, for each pixel of a plurality of pixels comprised in the occluded area, a corresponding list of polygons from the plurality of polygons; storing an advanced shadow map comprising the list of polygons for each pixel in the occluded area in a memory device; performing shadow rendering shadows for polygons in the list of polygons with the advanced shadow map, wherein the computing the list of polygons for each pixel is performed by a shader executed by a graphics processing system.

Embodiments include the above and wherein the determining an occluded area comprises: generating a normal shadow map for the plurality of pixels comprised in the graphical scene; rasterizing the graphical scene from the viewpoint of the camera; and comparing the rasterized graphical scene with the normal shadow map to determine the occluded area. Embodiments include the above and wherein the generating the normal shadow map comprises rasterizing the graphical scene from the viewpoint of a virtual light source comprised in the graphical scene, and storing a depth value for a plurality of pixels corresponding to the viewpoint of the virtual light source.

Embodiments include the above and wherein the plurality of polygons may comprise a plurality of triangles and wherein the normal shadow map may comprise depth information corresponding to pixels of the plurality of pixels.

Embodiments include the above and wherein the performing shadow rendering for the list of polygons comprises determining a boundary of the occluded area that separates the occluded area from non-occluded areas in the graphical scene and further wherein the determining the boundary of the occlude area comprises querying the normal shadow map to determine the boundary of the occluded area.

Embodiments include the above and wherein the performing shadow rendering for the polygons comprises referencing the normal shadow map to perform shadow rendering for the polygons entirely within the boundary of the occluded area and referencing the advanced shadow map to perform shadow rendering for polygons that overlap the boundary of the occluded area and wherein the performing shadow rendering for the polygons may comprise performing shadow rendering for the polygons entirely within the boundary of the occluded area and performing shadow rendering for the polygons that overlap the boundary of the occluded area in separate rendering passes.

Embodiments include the above and wherein the performing shadow rendering for the polygons comprises referencing the advanced shadow map to perform shadow rendering for the polygons entirely within the boundary of the occluded area and for the polygons that overlap the boundary of the occluded area and wherein the performing shadow rendering for the polygons may comprise performing shadow rendering for the polygons entirely within the boundary of the occluded area and performing shadow rendering for the polygons that overlap the boundary of the occluded area in separate rendering passes. Embodiments include the above and wherein the determining the boundary of the occluded area may comprise determining at least one fragment of at least one polygon of the list of polygons that overlaps the boundary of the occluded area, further wherein performing shadow rendering of polygons on the boundary of the occluded area comprises performing shadow rendering for all polygons with at least one fragment that overlaps the boundary of the occluded area.

Embodiments include the above and further comprising executing a plurality of processing threads in the graphics processing system, wherein the performing shadow rendering is performed by the plurality of processing threads. Embodiments include the above and wherein the computing the list of polygons comprises synchronizing access to the memory device between the plurality of processing threads executing in the graphics processing system. Embodiments include the above wherein the synchronizing access to the memory device is performed via atomic operations performed by a shader executed by the graphics processing system using at least one atomic operation.

Embodiments include the above and wherein the graphics processing system comprises a ray-triangle intersection unit, further wherein the computing the per pixel list of polygons is performed using the ray-triangle intersection unit. Embodiments include the above and wherein the shader may comprise at least one of: a fragment shader; and a compute shader.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Reference will now be made in detail to the preferred embodiments of the invention, a method and system for improving the efficiency of shadow mapping by using highly optimized hardware-accelerated rasterizers, examples of which are illustrated in the accompanying drawings. While the invention will be described in conjunction with the preferred embodiments, it will be understood that they are not intended to be limit to these embodiments. On the contrary, the invention is intended to cover alternatives, modifications and equivalents, which may be included within the spirit and scope as defined by the appended claims.

Furthermore, in the following detailed descriptions of embodiments of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the invention are directed to novel solutions for improving shadow mapping construction during graphics rendering.

Advanced Shadow Mapping in Accordance with Embodiments of the Present Invention

Figure 1:
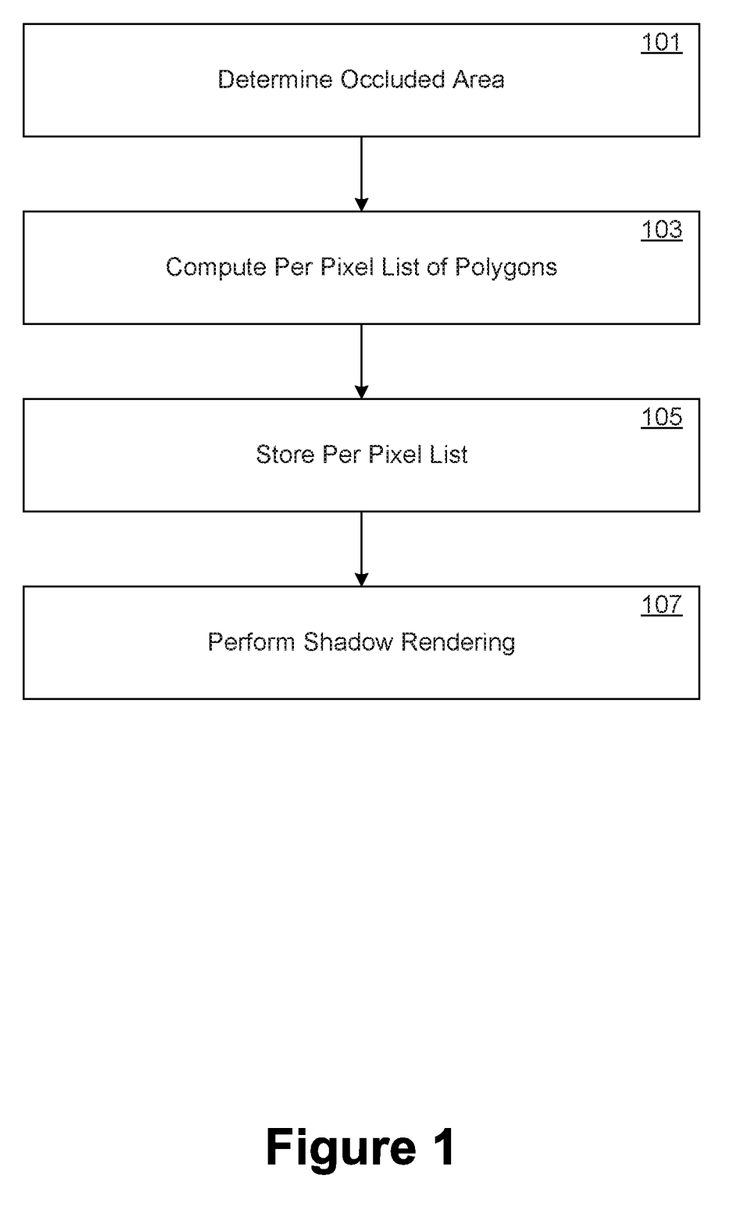
FIG. 1 depicts a flowchart of an exemplary process for performing shadow mapping, in accordance with various embodiments of the present invention.

FIG. 1 depicts a flowchart 100 of an exemplary process for performing shadow mapping, in accordance with various embodiments of the present invention. Steps 101-107 describe exemplary steps of the flowchart 100 in accordance with the various embodiments herein described. According to some embodiments, some or all of the steps 101-107 may be performed in a processor (specifically, a graphics processing system).

At step 101, one or more occluded areas are determined in a graphical scene. According to one or more embodiments, the graphical scene may be rasterized, and implemented as a plurality of pixels, arranged in a two-dimensional array, for example. In one or more embodiments, the graphical scene may depict one or more objects whose surfaces are graphically rendered (e.g., by a graphical processing system) as one or more polygons. In one or more embodiments, the polygons may comprise, for example, triangles. Alternately, trapezoids or other multi-sided polygons may be used according to various embodiments. Determining an occluded area may include, for example, determining which polygons (and fragments of polygons) are also within the occluded area in the graphical scene.

In one or more embodiments, determining an occluded area is performed by generating a first, or normal shadow map. Generation of the normal shadow map may be performed by rasterizing the scene from the perspective of a (virtual) light source in the graphical scene to determine color and/or depth information for the pixels (e.g., as coordinates) in the scene. Thereafter, the scene is re-rasterized from the point of view of the camera or intended viewer, and the coordinates of the pixels of the scene are compared to the depth information in the normal shadow map to determine which of the pixels correspond to an occluded area.

Once the occluded area in the scene is determined at step 101, an advanced shadow map is constructed that includes a list of polygons corresponding to each pixel in the occluded area at step 103. In one or more embodiments, the advanced shadow map may be generated as a per-pixel list of polygons that stores the exact number of polygons that share an intersection for each pixel. Construction of the advanced shadow map may be performed iteratively, with each per-pixel list of polygons being stored in a memory at step 105. In one or more embodiments, the memory is an external memory with respect to the graphics processing system. In one or more embodiments, construction of the advanced shadow map may be performed by one or more of a fragment shader and/or a compute shader executing in the graphics processing system. In still further embodiments, construction of the advanced shadow map may be performed by a hardware ray-triangle intersection unit comprised in the graphics processing unit.

Construction of the advanced shadow map is performed by a plurality of processing threads executing in the graphics processing system in parallel. In one or more embodiments, this may include, for example, generating fragments for every pixel touched by a graphics primitive (e.g., a polygon), using an atomic operation to count the number of polygons that intersect at each pixel, and storing the corresponding polygon in the per-pixel list. Since storage of the per-pixel list of polygons may include multiple accesses of the same memory address in parallel, synchronization may be necessary to prevent memory access faults and collisions. According to embodiments, the synchronization may be performed by using atomic operations via a shader executing in the graphics processing system.

The atomic operations may consist of pre-programmed or built-in operations available to an application programming interface (API) used to render graphics for one or more applications. For example, an application such as a video game, computer-aided design (CAD), virtual reality (VR), flight simulation, or visualization application may, during execution, outsource real-time rendering calculations to a GPU over an API such as OpenGL. In many instances, the rendered results are sent directly to the frame buffer of the video memory in the GPU instead of the main memory.

According to one or more embodiments, the atomic operations may consist of read-write functions performed using built-in operators (e.g., assignment) of the rendering API. In addition, atomic operations may also include a set of atomic access functions from an OpenGL Image Load/Store mechanism used to render graphical output for an application. These atomic operations may include, but are not limited to the following operations:

imageAtomicExchange ( );
imageAtomicCompSwap ( );
imageAtomicAdd ( );
imageAtomicAnd ( );
imageAtomicOr ( );
imageAtomicXor ( );
imageAtomicMin ( );
imageAtomicMax ( );
imageLoad ( ); and
imageStore ( ), The atomic operations may also consist of atomic access functions that can be applied to variables in storage blocks or Computer Shader shared variables. These access functions may include, but are not limited to the following operations:

atomicAdd ( )
    atomicMin ( )
    atomicMax ( )
    atomicAnd ( )
    atomicOr ( )
    atomicXor ( )
    atomicExchange ( ) and
    atomicCompSwap ( )

At step 107, shadow rendering is performed for the occluded area by referencing the advanced shadow map. In one or more embodiments, the shadows in the graphical scene may be rendered by the graphics processing system by shadow rendering the textures (polygons) listed in the advanced shadow map. By using the actual polygons themselves instead of merely fragments of polygons (e.g., as in a normal shadow map), a higher quality of shadows can be rendered that eliminates undesirable aliasing artifacts from imprecisely performed shadow rendering of polygons in the scene.

Figure 2:
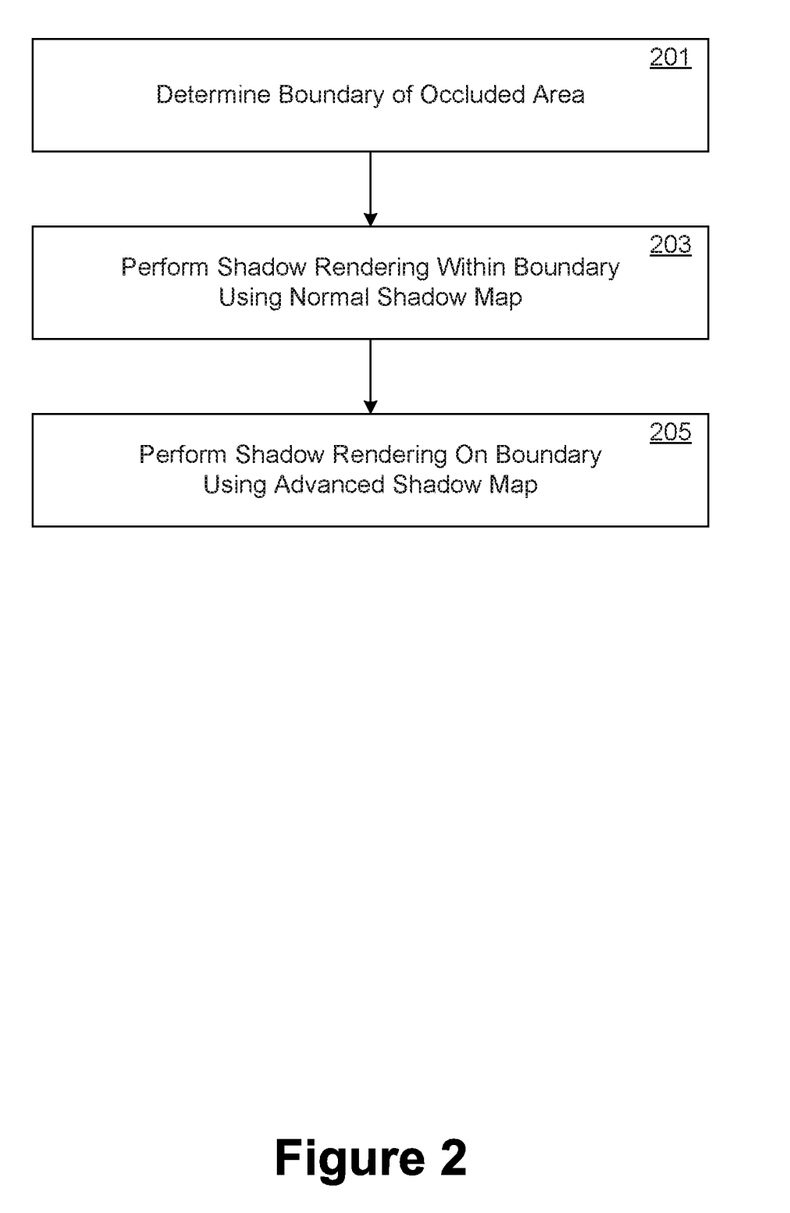
FIG. 2 depicts a flowchart of an exemplary process for performing shadow mapping using both a normal shadow map and an advanced shadow map, in accordance with various embodiments of the present invention.

In one or more embodiments, constructing an advanced shadow map for the entirety of an occluded area may not always be desirable, due to size requirements in memory, for example. According to such embodiments, the normal shadow map may be used to perform shadow rendering for some portions of the graphical scene. FIG. 2 depicts a flowchart of an exemplary process for performing shadow mapping using both a normal shadow map and an advanced shadow map, in accordance with various embodiments of the present invention. Steps 201-205 describe exemplary steps of the flowchart 200 in accordance with the various embodiments herein described. According to some embodiments, some or all of the steps 201-205 may be performed in a processor (specifically, a graphics processing system).

At step 201, the boundaries of the occluded area(s) in the graphical scene are determined. The boundary of an occluded area may be determined, for example, by querying the normal shadow map of the graphical scene and identifying the changes in depth between neighboring pixels. Once the boundary of an occluded area is determined, shadow rendering may be performed at step 203 using the normal shadow map for the polygons that lie entirely within the boundary of the occluded area. At step 205, shadow rendering may be performed using the advanced shadow map (e.g., the whole polygons) for the polygons that overlap the boundary of the occluded area. In one or more embodiments, each polygon with even portion (e.g., a fragment) that overlaps the boundary is rendered using the advanced shadow map.

According to alternate embodiments, the shadow rendering performed in steps 203 and 205 are performed in separate rendering passes. According to these embodiments, the shadow rendering is performed for those polygons that lie entirely within the boundary of the occluded area using the normal shadow map separately from the shadow rendering performed for the polygons that overlap the boundary of the occluded area using the advanced shadow map, e.g., either sequentially, or in parallel with multiple processing threads.

In still further embodiments, performing shadow rendering for polygons that overlap the boundary of an occluded area as well as the polygons that lie entirely within the boundary of the occluded area may be performed using an advanced shadow map, but using different processes and/or with different parameters. For example, since aliasing effects are most noticeable at or near a boundary, shadow rendering may be performed for the polygons at the boundary at a higher resolution than shadow rendering performed for polygons entirely within the boundary of the occluded area.

Figure 3:
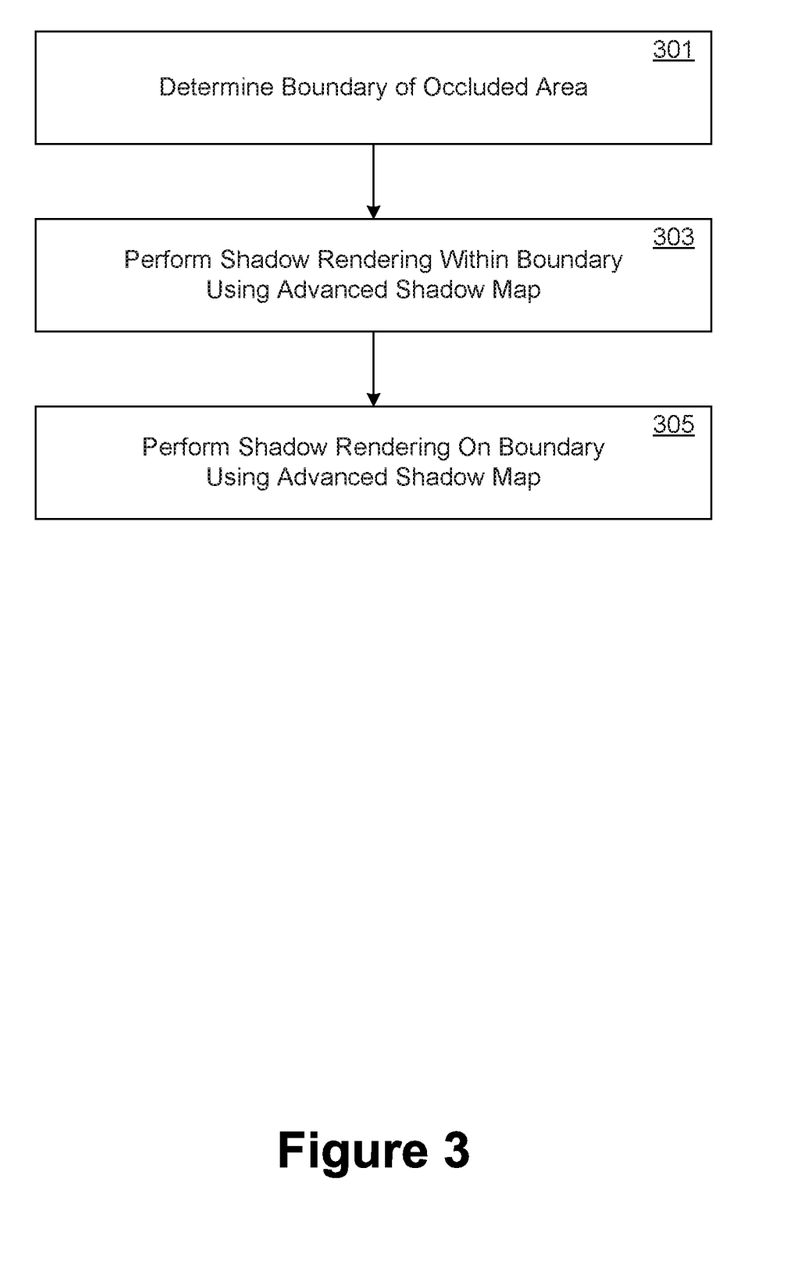
FIG. 3 depicts a flowchart of an exemplary process for performing shadow mapping using an advanced shadow map, in accordance with various embodiments of the present invention.

FIG. 3 depicts a flowchart of an exemplary process for performing shadow mapping using an advanced shadow map in different stages (passes). Steps 301-305 describe exemplary steps of the flowchart 300 in accordance with the various embodiments herein described. According to some embodiments, some or all of the steps 301-305 may be performed in a processor (specifically, a graphics processing system).

At step 301, the boundaries of the occluded area(s) in the graphical scene are determined. The boundary of an occluded area may be determined, for example, by querying the normal shadow map of the graphical scene and identifying the changes in depth between neighboring pixels. Once the boundary of an occluded area is determined, shadow rendering may be performed at step 303 using the advanced shadow map for the polygons that lie entirely within the boundary of the occluded area in a first rendering pass. At step 305, shadow rendering may be performed using the advanced shadow map (e.g., the whole polygons) for the polygons that overlap the boundary of the occluded area in a second rendering pass.

According to these embodiments, the shadow rendering performed in steps 303 and 305 are performed in separate rendering passes. However, in contrast to the embodiments described above with respect to FIG. 2, shadow rendering performed for those polygons that lie entirely within the boundary of the occluded area is also performed using the advanced shadow map, albeit separately from the shadow rendering performed for the polygons that overlap the boundary of the occluded area which also uses the advanced shadow map, but may be performed sequentially, or in parallel with multiple processing threads.

Exemplary Computing Device

Figure 4:
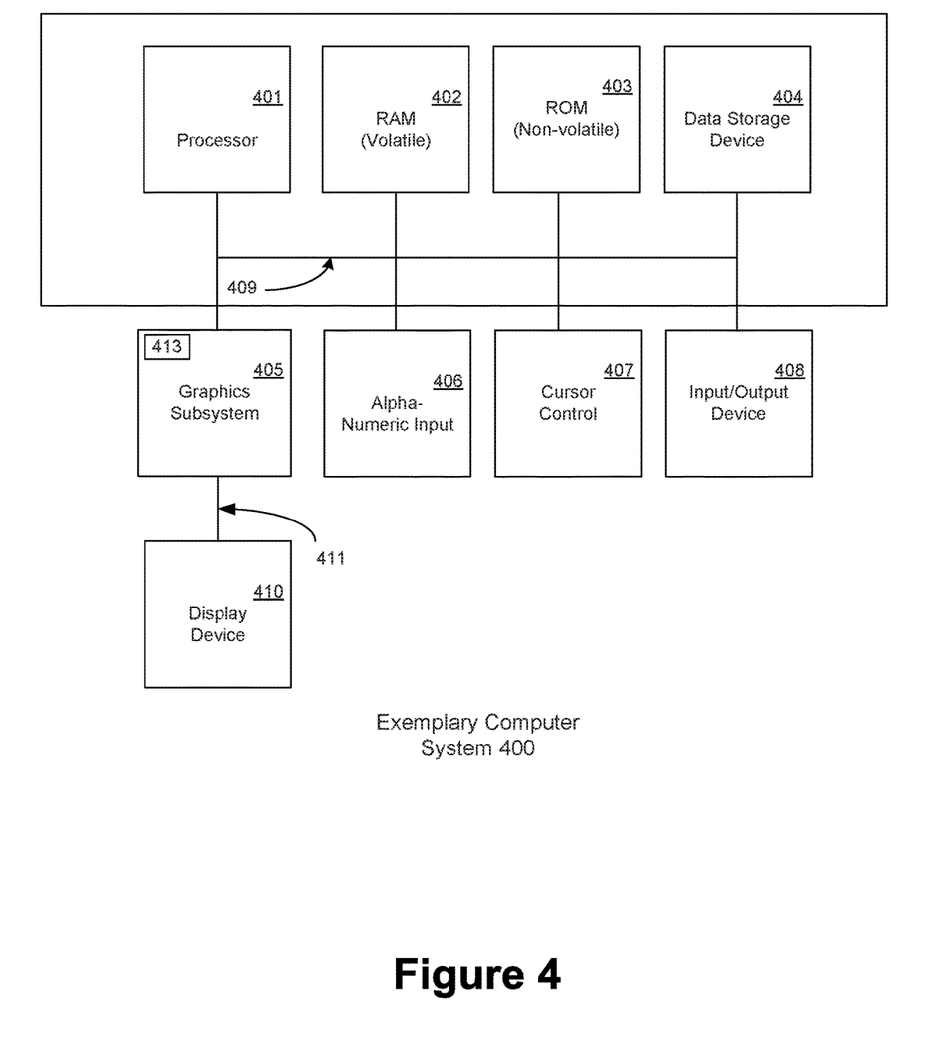
FIG. 4 depicts an exemplary computing system upon which embodiments of the present invention may be implemented, in accordance with various embodiments of the present invention.

As presented in FIG. 4, an exemplary system upon which embodiments of the present invention may be implemented includes a general purpose computing system, such as computing system 400. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two.

Computer system 400 may also comprise an optional graphics subsystem 405 for presenting information to the computer user, e.g., by displaying information on an attached display device 410, connected by a video cable 411. According to embodiments of the present claimed invention, the graphics subsystem 405 may be configured to implement one or more shaders, such as a fragment or compute shader 413 operable to generate and store (in memory) an advanced shadow map as described above with respect to FIGS. 1-3, and operable to synchronize access requests of a plurality or parallel processing threads during construction of the shadow map stored in the memory (e.g., RAM 402), the graphics subsystem 405 may be coupled directly to the display device 410 through the video cable 411. A graphical user interface executing in the computer system 400 may be generated in the graphics subsystem 405, for example, and one or more graphical scenes (including scenes with rendered shadows) may be displayed to the user in the display device 410. In alternate embodiments, display device 410 may be integrated into the computing system (e.g., a laptop or netbook display panel) and will not require a video cable 411. In one embodiment, the processes 200 and 300 may be performed, in whole or in part, by graphics subsystem 405 in conjunction with the processor 401 and memory 402, with any resulting output displayed in attached display device 410.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for performing shadow mapping, the method comprising:
   determining an occluded area in a graphical scene comprising a plurality of pixels, the graphical scene depicting a plurality of objects graphically rendered as a plurality of polygons;
   computing, for each pixel of the plurality of pixels comprised in the occluded area, a corresponding list of polygons from the plurality of polygons;
   generating an advanced shadow map comprising, for each pixel in the occluded area in a memory device, a second list of polygons that intersect the pixel, wherein said second list of polygons comprises more than one polygon from the plurality of polygons;
   performing shadow rendering for the second list of polygons with the advanced shadow map,
   wherein the computing the second list of polygons for each pixel is performed by a shader executed by a graphics processing system.

2. The method according to claim 1, wherein the determining an occluded area comprises:
   generating a normal shadow map for the plurality of pixels comprised in the graphical scene;
   rasterizing the graphical scene from the viewpoint of the camera; and
   comparing the rasterized graphical scene with the normal shadow map to determine the occluded area.

3. The method according to claim 2, wherein the generating the normal shadow map comprises rasterizing the graphical scene from the viewpoint of a virtual light source comprised in the graphical scene, and storing a depth value for a second plurality of pixels corresponding to the viewpoint of the virtual light source.

4. The method according to claim 2, wherein the normal shadow map comprises depth information corresponding to pixels of the plurality of pixels.

5. The method according to claim 2, wherein the performing shadow rendering for the second list of polygons comprises determining a boundary of the occluded area that separates the occluded area from non-occluded areas in the graphical scene.

6. The method according to claim 5, wherein the determining the boundary of the occlude area comprises querying the normal shadow map to determine the boundary of the occluded area.

7. The method according to claim 6, wherein the performing shadow rendering for the second list of polygons comprises referencing the normal shadow map to perform shadow rendering for the polygons entirely within the boundary of the occluded area and referencing the advanced shadow map to perform shadow rendering for polygons that overlap the boundary of the occluded area.

8. The method according to claim 7, wherein the performing shadow rendering for the second list of polygons comprises performing shadow rendering for the polygons entirely within the boundary of the occluded area and performing shadow rendering for the polygons that overlap the boundary of the occluded area in separate rendering passes.

9. The method according to claim 6, wherein the performing shadow rendering for the second list of polygons comprises referencing the advanced shadow map to perform shadow rendering for the polygons entirely within the boundary of the occluded area and for the polygons that overlap the boundary of the occluded area.

10. The method according to claim 9, wherein the performing shadow rendering for the second list of polygons comprises performing shadow rendering for the polygons entirely within the boundary of the occluded area and performing shadow rendering for the second list of polygons that overlap the boundary of the occluded area in separate rendering passes.

11. The method according to claim 5, wherein the determining the boundary of the occluded area comprises determining at least one fragment of at least one polygon of the second list of the polygons that overlaps the boundary of the occluded area, further wherein performing shadow rendering of polygons on the boundary of the occluded area comprises performing shadow rendering for all polygons with at least one fragment that overlaps the boundary of the occluded area.

12. The method according to claim 1, wherein the plurality of polygons comprise a plurality of triangles.

13. The method according to claim 1, further comprising executing a plurality of processing threads in the graphics processing system, wherein the performing shadow rendering is performed by the plurality of processing threads.

14. The method according to claim 13, wherein the computing the second list of polygons comprises synchronizing access to the memory device between the plurality of processing threads executing in the graphics processing system.

15. The method according to claim 14, wherein the synchronizing access to the memory device is performed by a shader executed by the graphics processing system using at least one atomic operation.

16. The method according to claim 1, wherein the graphics processing system comprises a ray-triangle intersection unit, further wherein the computing the per pixel list of polygons is performed using the ray-triangle intersection unit.

17. The method according to claim 1, wherein the shader comprises at least one of:
a fragment shader; and
a compute shader.

18. A system for constructing advanced shadow maps, the system comprising:
a display device;
a memory device; and
a processing unit configured to execute a fragment shader and operable to determine an occluded area in a graphical scene depicting a plurality of objects graphically rendered as a plurality of polygons and comprising a plurality of pixels, to compute a corresponding list of polygons from the plurality of polygons for each pixel of the plurality of pixels comprised in the occluded area with the fragment shader, to store the list of polygons in the memory device, to perform shadow rendering for polygons in the list of polygons in the occluded area with the advanced shadow map, and to display the graphical scene in the display device, wherein said list of polygons comprises more than one polygon from the plurality of polygons.

19. The system according to claim 18, wherein the processing unit is further configured to determine a boundary of the occluded area, to perform shadow rendering for the list of polygons entirely within the occluded area with a normal shadow map, and to perform shadow rendering for the list of polygons overlapping the boundary of the occluded area with the advanced shadow map.

20. A non-transitory computer readable medium comprising having computer executable instructions for causing a computer system to perform a method for performing shadow mapping, the instructions comprising:
instructions to determine an occluded area in a graphical scene comprising a plurality of pixels, the graphical scene depicting a plurality of objects graphically rendered as a plurality of polygons;
instructions to compute, for each pixel of the plurality of pixels comprised in the occluded area, a corresponding list of polygons from the plurality of polygons that intersect the pixel, wherein said list of polygons comprises more than one polygon from the plurality of polygons;
instructions to store an advanced shadow map comprising the list of polygons for each pixel in the occluded area in a memory device; and
instructions to perform shadow rendering for the list of polygons with the advanced shadow map,
wherein the computing the list of polygons for each pixel is performed by a shader executed by a graphics processing system.

* * * * *